(12) United States Patent
Rye

(10) Patent No.: US 11,632,942 B1
(45) Date of Patent: Apr. 25, 2023

(54) LURE WITH SUCTION FEATURES

(71) Applicant: Ryan Rye, Suwanee, GA (US)

(72) Inventor: Ryan Rye, Suwanee, GA (US)

( * ) Notice: Subject to any disclaimer, the term of this patent is extended or adjusted under 35 U.S.C. 154(b) by 130 days.

(21) Appl. No.: 17/241,226

(22) Filed: Apr. 27, 2021

(51) Int. Cl.
*A01K 85/00* (2006.01)

(52) U.S. Cl.
CPC .................................. *A01K 85/00* (2013.01)

(58) Field of Classification Search
CPC ...... A01K 85/00; A01K 85/01; A01K 85/011; A01K 85/012; A01K 85/1811; A01K 85/1813; A01K 85/1821; A01K 85/1823; A01K 85/1827; A01K 85/1831; A63H 23/10; A63H 23/00
USPC ............. 43/42.24, 42.26, 42.28, 42.29, 42.3, 43/42.32, 42.33, 42.34, 42.37, 42.38; 446/92, 153, 176, 268, 320, 368
See application file for complete search history.

(56) References Cited

U.S. PATENT DOCUMENTS

| 2,219,130 | A | * | 10/1940 | Herrmann | A63H 3/04 446/374 |
| 2,844,912 | A | * | 7/1958 | Sebesta | A63H 23/10 446/155 |
| 4,197,667 | A | * | 4/1980 | Helfenstine | A01K 85/00 43/4.5 |
| 4,235,041 | A | * | 11/1980 | Sweet | A63H 3/36 D21/585 |
| D300,449 | S | * | 3/1989 | Tucker | D21/601 |
| 5,288,257 | A | * | 2/1994 | Zacherl | A63H 3/36 D21/600 |
| 6,115,956 | A | * | 9/2000 | Firmin | A01K 85/01 43/42.24 |
| 8,020,338 | B2 | | 9/2011 | Brown | |
| 9,308,463 | B2 | * | 4/2016 | Bartels | A63H 33/18 |
| D768,245 | S | * | 10/2016 | Matthews | D21/601 |
| 2006/0037230 | A2 | | 2/2006 | Oelerich, Jr. et al. | |

* cited by examiner

*Primary Examiner* — Timothy D Collins
*Assistant Examiner* — Maria E Graber

(57) ABSTRACT

A fishing lure has an elastomeric or soft plastic body containing multiple suction features along its surface. By being capable of sticking to the roof of the fish's mouth or the fish's tongue, the suction features help increase the chance that the lure remains in the fish's mouth a few more seconds prior to an angler's hookset. The combination of the suction features' tactile feel and their adhering ability results in a unique advantage for any type of soft plastic fishing lure.

12 Claims, 5 Drawing Sheets

LURE WITH SUCTION FEATURES

BACKGROUND INFORMATION

Existing soft plastic fishing lures comprise lifelike appendages and scented attractants designed to attract and entice a nearby fish. Once a lure is bitten, a fish often takes a few seconds to interpret the lure's feel and taste in order to decide if it is real or artificial. If a fish concludes that the lure is not real prey, the fish will often spit out the lure moments before an angler sets the hook, resulting in a missed fish.

During the brief moments when the fish is evaluating the lure in its mouth, it would be more advantageous if the lure contained features that actually helped prevent the lure from being easily spit out. A lure having suction features could be capable of sticking to or adhering to either the smooth roof of the fish's mouth or a smooth fish's tongue. That is, if the suction features were in an optimal location when the lure was bitten, the suction features holding onto the inner surface of the fish's mouth could make the lure more difficult to spit out and give the angler a few more seconds within which to both detect the fish and set the hook.

SUMMARY OF THE INVENTION

A fishing lure is comprised of a soft plastic or elastomeric body member. At least one suction feature protrudes from the body member or an appendage of the body member. The suction features are desirably located in the rearward two thirds region of the lure, since that is the portion of the lure most likely to be bitten by a fish that is trailing or stalking the lure. A suction feature arrangement can comprise thin-walled conical or circular cups, a plurality of thin-walled closed-loop non-circular shapes, or any combination thereof.

REFERENCE NUMERALS

Figure 1A:
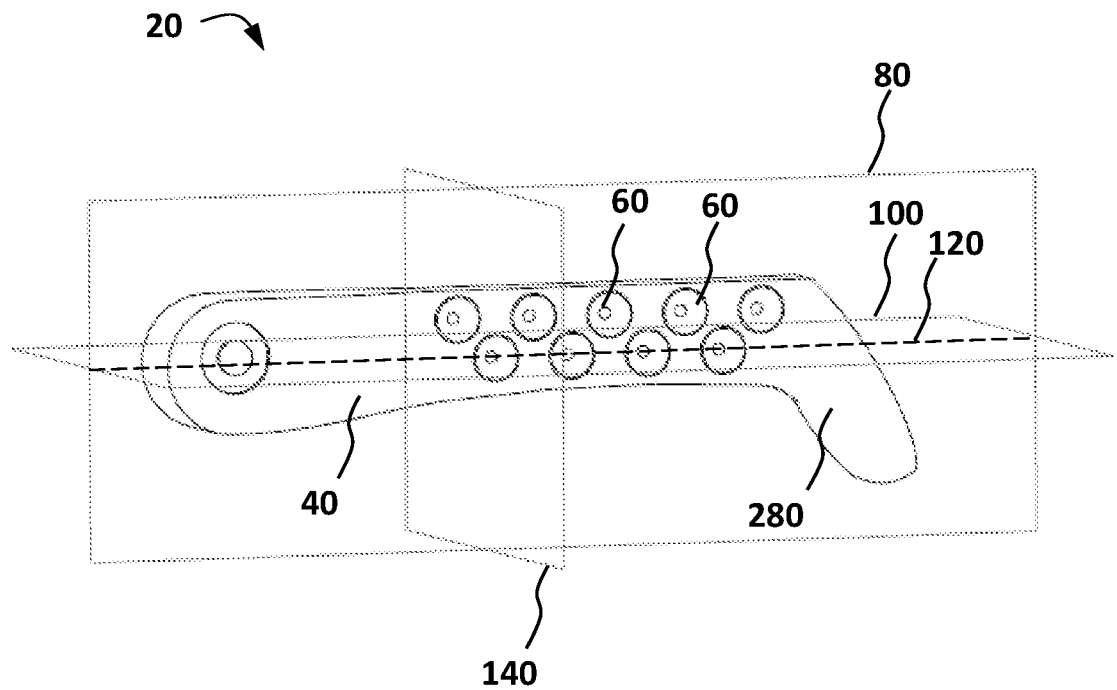
FIG. 1A is a diagrammatic perspective view of a first preferred embodiment of a lure with suction features, wherein each suction feature has a shape similar to a concave cup or partial cone.

20 lure
40 body member
60 suction feature
80 median plane
100 frontal plane
120 longitudinal axis
140 transverse plane
160 forward end
180 rearward end
200 overall length
220 forward third
240 middle third
260 rearward third
280 appendage
300 body member thickness

DETAILED DESCRIPTION OF PREFERRED EMBODIMENTS

Figure 1B:
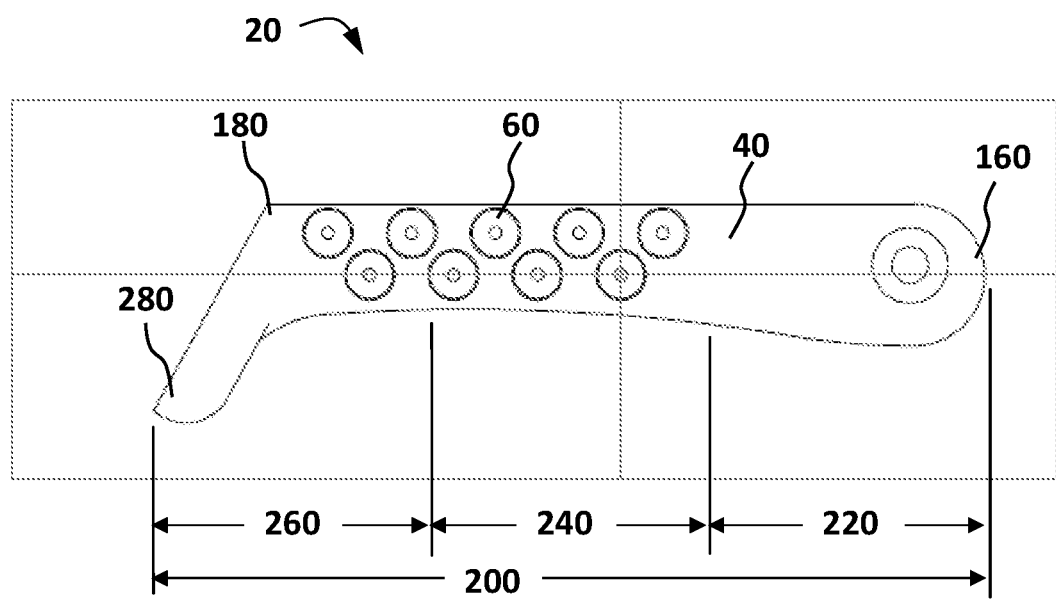
FIG. 1B is a diagrammatic side view of the first preferred embodiment.
Figure 1C:
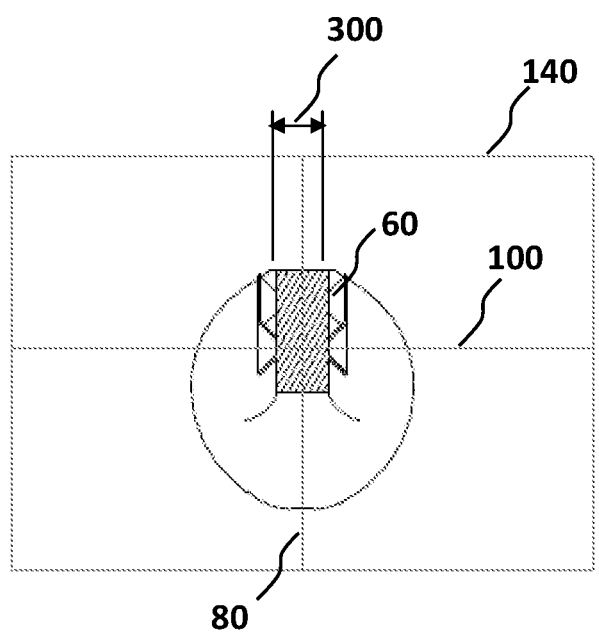
FIG. 1C is a diagrammatic section view of the first preferred embodiment taken through a plane parallel to the transverse plane.

FIGS. 1A-1C illustrate a lure 20 comprised of a body member 40 and at least one suction feature 60 protruding from the body member 40. The lure 20 can be further characterized by a median plane 80 dividing the lure 20 into left and right halves, a frontal plane 100 perpendicular to the median plane and dividing the lure 20 into both anterior (belly) and posterior (back) portions, a longitudinal axis 120 formed by the intersection of the median plane 80 and the frontal plane 100, and a transverse plane 140 perpendicular to both the median plane 80 and the frontal plane 100.

FIG. 1B is a side view of the lure 20, while FIG. 1C is a cross-section view through an arbitrary plane parallel to the transverse plane 140, showing that the suction features of this embodiment have a thin-walled v-shape or concave cup shape and are aimed or pointed in a direction perpendicular to the median plane 80. In any embodiment, the suction features are capable of protruding towards, or capable of facing, a direction perpendicular to any plane passing through the longitudinal axis 120. To be more precise regarding suction feature 60 orientation for any embodiment, each suction feature 60 is outward facing and not forward facing (facing in front of the lure) or rearward facing (facing behind the lure). Another way of stating this is that each suction feature 60 faces a direction that is non-parallel with the longitudinal axis 120.

Regarding the suction features of this first embodiment, the suction features comprise an alternating arrangement in order to populate the side surfaces of the lure 20 with a substantial number of suction features that can fit on the side surfaces. Connecting and linking the center points of subsequent pairs of adjacent suction features forms an imaginary zig-zag line that defines the arrangement. Although not shown, at least one stiffening rib in the shape of a thin-walled protrusion, having a thickness less than the thickness of the body member, can be used to connect or link more than one suction feature together in order to help ensure a rigid arrangement and ensure any flimsy suction features remain oriented in a desired direction. To enable the desired suction performance, the outline of each suction feature 60 comprises a closed-loop shape. Although not shown by FIGS. 1A-1C, any two suction features can vary in height. Any two suction features can also vary in diameter—if a circular shape—or vary in the maximum distance between any two points along the closed loop outline of a suction feature—if a non-circular shape.

In FIG. 1B, the body member 40 is further characterized by a forward end 160 and a rearward end 180, with the overall length 200 of the lure divided into thirds: a forward third 220, a middle third 240, and a rearward third 260. The suction features are substantially located desirably in the rearward two thirds of the lure 20, namely the middle third 240 and the rearward third 260, as this is the region most likely to make contact with the fish's inner mouth or tongue when a fish takes the lure in its mouth. The lure 20 in this embodiment has one appendage 280—in this example a tail fin—protruding from the body member 40 and located in the rearward third 260 of the lure.

It should be noted that multiple appendages can protrude from one or more regions of the body members of any of the embodiments described herein, and any appendage can be more thick, less thick, or vary in thickness relative to the body member thickness 300. The body member thickness 300 itself can be generally constant throughout the length 200, or it too can also be variable. An appendage is an external body part in the general shape of a tail, limb, fin, flipper, arm, leg, claw, antennae, or similar. Substantially all appendages are desirably located within the middle third 240 and rearward third 260 of the lure, since again that is the section of the lure most likely bitten by a curious fish. Note that it should also be obvious that suction features can exist on more than one surface of the lure; i.e., on a body member 40 and also simultaneously on least one appendage 280.

A suction feature 60 can be described as a thin-walled raised outline shape, capable of creating a small vacuum (and resulting in a suction force) when the suction feature 60 is pressed or compressed against a smooth mating surface. A suction feature 60 can be further characterized by its height, which is the distance it protrudes out beyond a base body member or appendage, the thickness of its thin wall, and the maximum distance between two points along its perimeter, e.g. its diameter if it is a circle. Ideally a suction feature's height is greater than its thin wall thickness, and the maximum distance between two points along its perimeter is at least 5 times greater than the thickness of its thin wall. An optimal suction feature would be both flexible, in order to easily grab onto inner mouth surfaces, and of substantial diameter if circular, in order to generate a significant amount of suction once bitten or compressed. As an example, a desirable suction feature in the shape of a partial cone or concave cup would have a wall thickness in the range of 0.3-0.9 mm, a diameter at the base of 1.5-6 mm, and a diameter at the outer edge of 3-12 mm.

Figure 2:
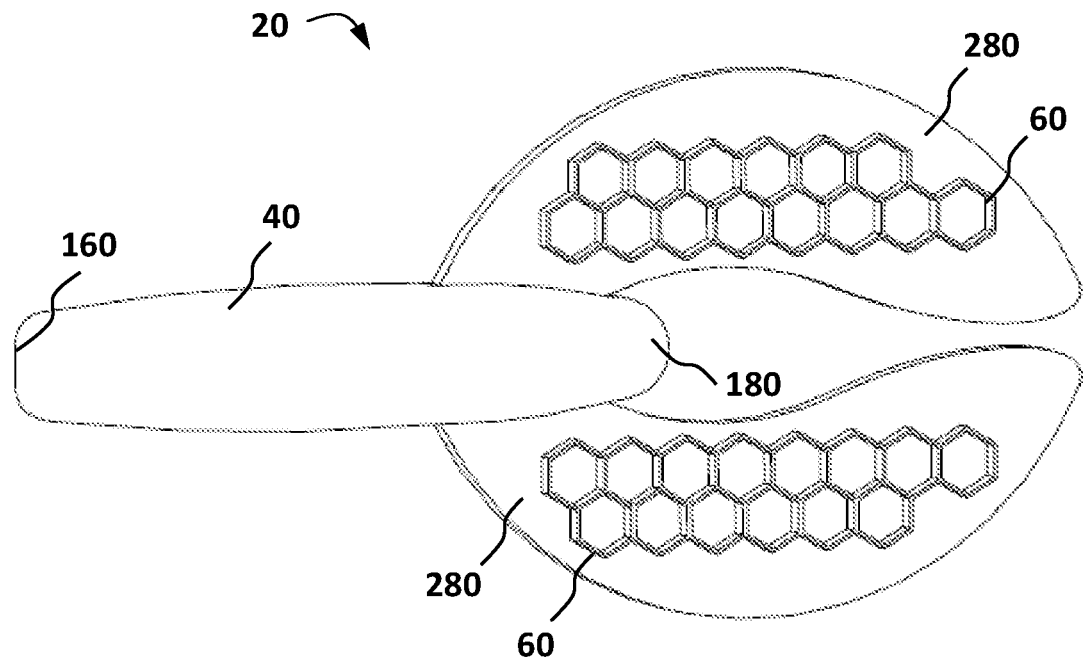
FIG. 2 is a diagrammatic perspective view of a second preferred embodiment of a lure with suction features, wherein each suction feature is in the form of a thin-walled raised hexagonal shape.

FIG. 2 shows a second preferred embodiment of a lure 20 with suction features, in which the suction features are located on multiple appendages that are attached to the body member 40. By being able to also protrude from more than one appendage 280, the suction features 60 can cover more surface area of the lure and increase the chance that at least one suction feature 60 adheres to the roof of the fish's mouth or the fish's tongue. In this embodiment, the suction features comprise a pattern of thin-walled raised hexagons, with a hexagon sharing at least one of its thin walls with an adjacent hexagon. If additional rows were shown, then it would be evident that at least some suction features could share all six sides or walls with surrounding suction features. It should be noted that although hexagons are shown, any polygonal shape can be used to create an arrangement, but not necessarily a repeating pattern, of suction features, and at least one polygonal suction feature is capable of sharing all of its side walls with surrounding suction features. An arrangement of suction features on a body member 40 or appendage 280 can comprise triangles, squares, rectangles, pentagons, octagons, any other polygonal shape, any closed loop shape, or any combination thereof.

Figure 3:
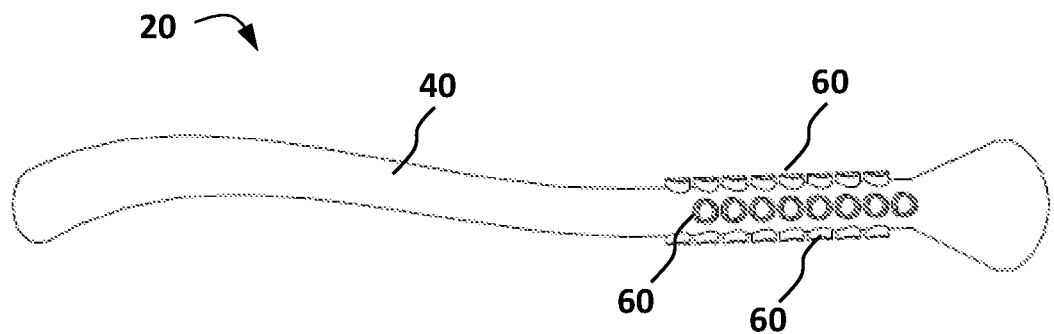
FIG. 3 is a diagrammatic perspective view of a third preferred embodiment of a lure with suction features, wherein each suction feature is in the form of a raised shape outline comprising repeating circles that are directed radially outward from the body member.

FIG. 3 details a lure 20 with an elongated body member 40, i.e. a worm shape, containing more than one outward facing suction feature 60, in which the suction features are in the form of circular thin-walled protrusions. Multiple rows of suction features are shown protruding outwardly or protruding radially from the body member. Although not shown, oval or other closed-loop non-circular shapes can also be used as suction features, either by themselves, in combination with circular shapes, or in combination with polygonal shapes.

Figure 4A:
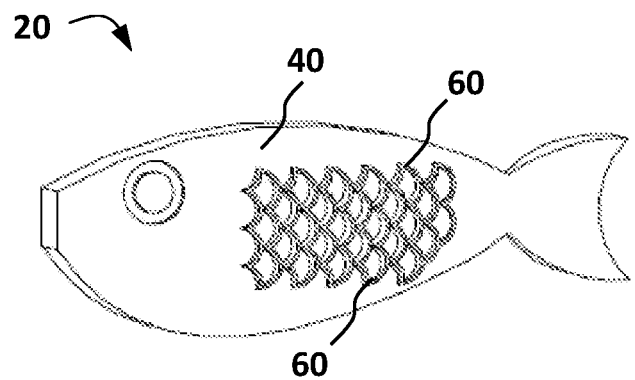
FIG. 4A is a diagrammatic perspective view of a fourth preferred embodiment of a lure with suction features, wherein each suction feature is in the form of a raised shape outline resembling a scale of a minnow or other prey fish.
Figure 4B:
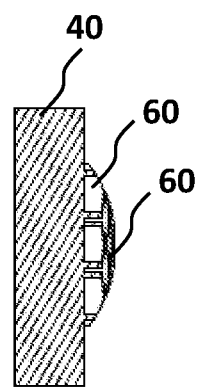
FIG. 4B is a diagrammatic section view of the fourth preferred embodiment, showing that the suction features vary in height along the surface of the lure.

In FIG. 4A, each suction feature 60 comprises a thin-walled raised shape resembling a fish scale, with the arrangement of scale-shaped suction features creating an appearance of the skin of a minnow or other prey fish. The section view of FIG. 4B is taken through a plane parallel with the transverse plane 140 of the lure 20, and it illustrates that the arrangement of suction features is shown to clearly taper in height along the side of the lure. In other words, a given suction feature 60 is not necessarily the exact same height as an adjacent suction feature. Thus, at least two suction features can vary in height within an entire arrangement of suction features for this embodiment or any embodiment described herein. In addition, and although only shown on one side of the body member 40 in FIGS. 4A-4B, suction features can protrude from multiple sides or different faces of a given body member or appendage.

Figure 5:
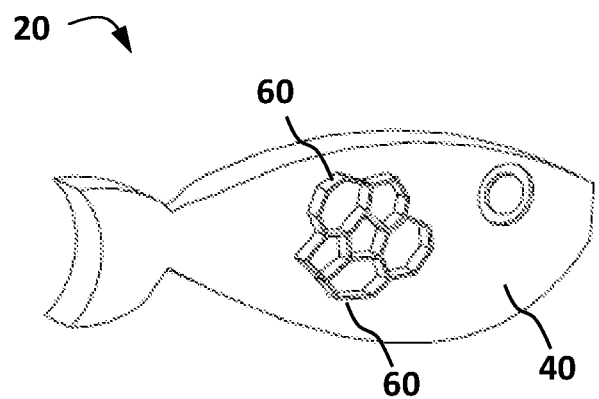
FIG. 5 is a diagrammatic perspective view of a fifth preferred embodiment of a lure with suction features, wherein one suction feature shape shares at least one edge with an adjacent suction feature shape, but the shapes within the arrangement have different outlines.

In FIG. 5, the arrangement of more than one suction feature 60 comprises suction features of varying shapes. That is, adjacent suction features do not necessarily have the same number of sides. It should again be noted that any suction feature of any preferred embodiment can be any closed loop thin-walled shape that protrudes from the body member or appendage. Thus, the possible suction feature arrangements taught in FIGS. 1A-5 can also vary in both height and closed-loop shape, resulting in the ability to create a unique, yet functional, suction feature arrangement from any desired combination of raised thin-wall closed-loop shapes.

There are many obvious variations of the preferred embodiments described herein. The body member or at least one appendage can also include attractive elements such as glitter or color additives, or it can include an attractive scent such as garlic or coffee grounds. The body member can also comprise a slot or groove for the easy receiving of, or easy alignment of, a fishing hook that can pass through the body member.

While certain preferred embodiments have been described and shown in the accompanying drawings, it is to be understood that such preferred embodiments are merely illustrative of, and not restrictive on, the broad invention. It is intended that the scope of the invention be defined by the following claims and their equivalents.

The invention claimed is:

1. A fishing lure comprising:
    an elastomeric body member, wherein at least one appendage protrudes from said elastomeric body member;
    more than one suction cup feature protruding from said at least one appendage, wherein each suction cup feature has a plurality of side walls which form a raised polygonal outline;
    wherein said at least one appendage forms a rear wall of said more than one suction cup feature; and wherein each raised polygonal outline shares at least one of its side walls with an adjacent suction cup feature.

2. The fishing lure in accordance with claim 1, wherein said more than one suction cup feature varies in size with an adjacent suction cup feature.

3. The fishing lure in accordance with claim 1, wherein said raised polygonal outline of said more than one suction cup feature is a pentagon or hexagon.

4. The fishing lure in accordance with claim 1, wherein said appendage is in the shape of a tail or claw.

5. The fishing lure in accordance with claim 1, wherein said more than one suction cup feature forms a pattern of hexagons.

6. The fishing lure in accordance with claim 1, wherein said more than one suction cup feature is located on more than one surface of the lure.

7. A fishing lure comprising:
- an elastomeric body member, wherein at least one appendage protrudes from said elastomeric body member;
- more than one suction cup feature protruding from said elastomeric body member, wherein said more than one suction cup feature has a plurality of side walls which form a raised polygonal outline;
- wherein said elastomeric body member forms a rear wall of said more than one suction cup feature;
- wherein each raised polygonal outline shares at least one of its side walls with an adjacent suction cup feature.

8. The fishing lure in accordance with claim 7, wherein said more than one suction cup feature varies in size with an adjacent suction cup feature.

9. The fishing lure in accordance with claim 7, wherein said raised polygonal outline of said more than one suction cup feature is a pentagon or hexagon.

10. The fishing lure in accordance with claim 7, wherein said appendage is in the shape of a tail or claw.

11. The fishing lure in accordance with claim 7, wherein said more than one suction cup feature forms a pattern of hexagons.

12. The fishing lure in accordance with claim 7, wherein said more than one suction cup feature is located on more than one surface of the lure.

* * * * *